L. R. MEYER & R. J. YOUNG.
COMPUTING WEIGHING SCALE.
APPLICATION FILED JUNE 16, 1910.

976,275.

Patented Nov. 22, 1910.
2 SHEETS—SHEET 1.

WITNESSES
E. H. Walker.
J. T. Walker.

INVENTORS
Lee R. Meyer
Robert J. Young
by Geo. H. Evans
Attorney

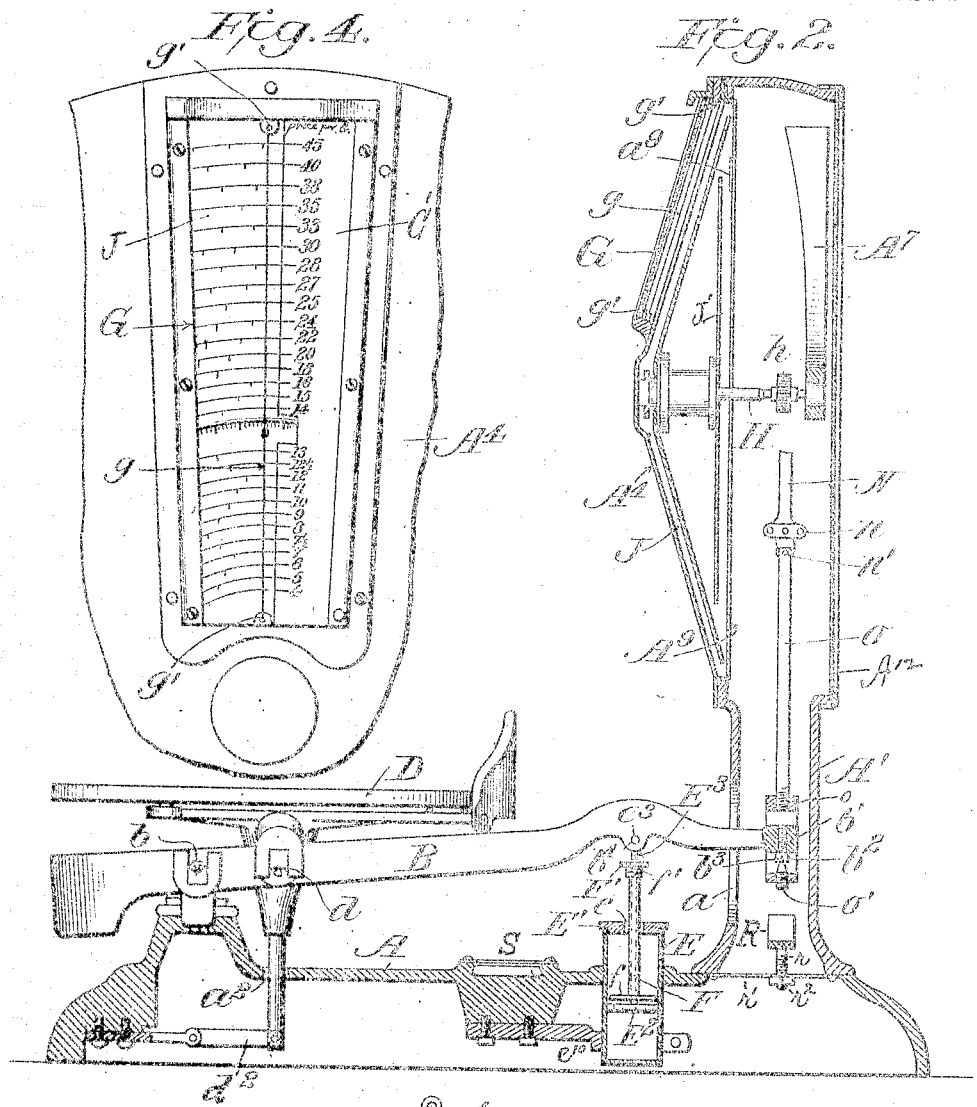

UNITED STATES PATENT OFFICE.

LEE R. MEYER AND ROBERT J. YOUNG, OF ALTON, ILLINOIS.

COMPUTING WEIGHING-SCALE.

976,275. Specification of Letters Patent. Patented Nov. 22, 1910.

Application filed June 16, 1910. Serial No. 567,325.

*To all whom it may concern:*

Be it known that we, LEE R. MEYER and ROBERT J. YOUNG, citizens of the United States, residing at Alton, in the county of Madison and State of Illinois, have invented certain new and useful Improvements in Computing Weighing-Scales, of which the following is a specification.

Our invention relates to computing weighing scales.

The main object of the invention is to provide a novel and efficient pendulum mechanism for actuating the dial or indicator of the scale. This object we accomplish by the construction shown in the accompanying drawings, in which—

Figure 1:
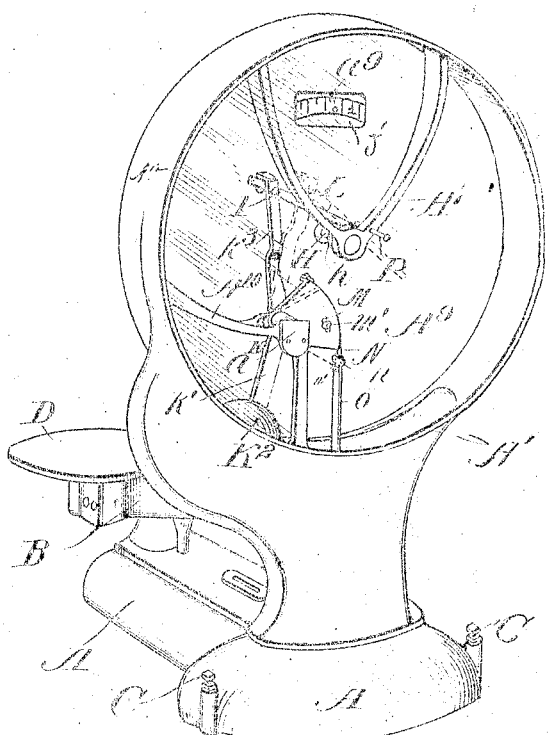
Figure 3:
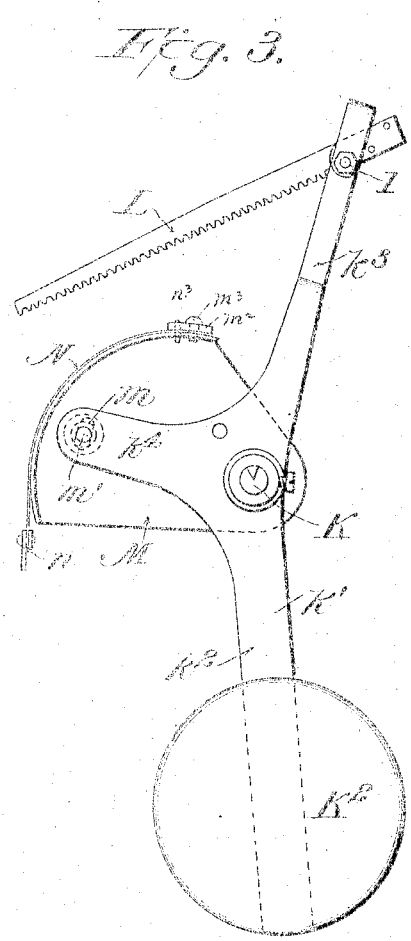
Figure 5:
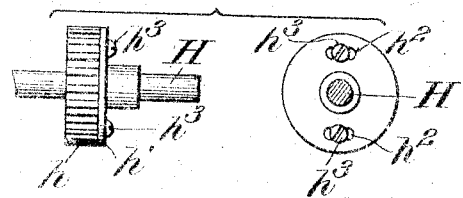

Figure 1 is a rear perspective of a computing scale embodying our improvements. Fig. 2 is a longitudinal vertical section thereof. Fig. 3 is a side elevation of the pendulum mechanism removed. Fig. 4 is a fragmentary elevation at the front sight opening. Fig. 5 is a detail showing the dial-pinion and shaft. Fig. 6 is a detail sectional view of the dash pot.

A indicates the base of the frame, to one end of which is connected the lower end or neck of the dial housing A'.

B indicates the yoke-shaped scale beam mounted in knife-edge bearings at $b$, on the base and extending thence along the upper side of the base with its long arm projecting through a slot $a$, in the neck of the dial casing where it is provided with a threaded vertical aperture $b'$ having a bearing screw $b^2$, mounted therein. The lower end of the screw $b^2$ has a conical recess $b^3$ therein for a purpose to be hereinafter described.

C, C are leveling screws mounted in the base at opposite sides of the dial casing.

D is the scale-platform having knife-edge bearings at $d$, on the wider end of the beam B. From the under side of the platform depends a guide rod which extends through an aperture $a^2$ in the base and is pivotally connected with the interior of the base by a link $d^2$ so that the platform will be held to vertical movement only.

E is an oil-containing dash-pot mounted in the base A, near the dial housing, braced near its lower end by a bracket $e^{10}$, secured to the under side of the base and closed at its upper end by a screw cap E'. This cap E' is provided with a central threaded aperture $e$.

E² is the piston having apertures $e^2$ and provided with a piston rod E³ pivotally connected at its apertured upper end by a removable pin $e^3$ to a transversely apertured lug $b^4$ on the underside of the scale beam B. The piston rod E³ is provided with screw threads $e^4$ just below its upper extremity.

F, is a long sleeve or tube inclosing the piston rod and provided at its lower end with a valve-forming disk $f$, overlying the apertured piston E². The upper end of the tube or sleeve F, is provided with a nut F' having an external threaded surface $f$, to fit the aperture $e$, in the cap E', and an internal thread $f'$, working on the thread $e^4$ of the piston rod. Thus when being shipped with the piston rod detached from the scale beam B, the nut F' may be screwed into the aperture $e$ to close the same and hold the piston rod and valve tube in place and when the piston rod is connected to the scale beam the nut F' may be turned on the thread $e^4$ to raise or lower the valve disk $f$, to allow the oil to pass through the apertures with greater or less freedom and so properly check the vibration of the beam and connected parts.

The rear side of the dial casing A', is closed by a cover plate A⁴ having a vertical sight slot in its upper central portion. Over this slot is placed a glazed frame G, provided with a vertical wire pointer $g$, the ends of which are secured to the clips $g'$, $g'$. To the right of wire $g$, is placed a vertically disposed price per pound card, G'.

Within the upper part the dial casing is provided a depending bracket A⁷, in the lower end of which is mounted one end of the dial or indicator shaft H, the opposite end being mounted in a bearing on the inner face of the cover plate A⁴. The dial J, is secured to the shaft H, and lies between the cover plate A⁴ and an inner circular plate A⁹ having a sight opening near its upper edge centrally of which depends a pointer, $a^9$. J', is a second dial, between dial J and plate A⁹, having an annularly arranged series of graduations indicating pounds and fractions thereof so that the purchaser may see that proper weight is given. The rear side of the dial J is graduated as a computing scale and in connection with the wire $g$, and the price per pound card will give the price of the article weighed.

The dial shaft H is provided with an adjustable pinion $h$, secured to it by means of a flange $h'$ integral with the shaft and having segmental slots $h^2$ through which screws $h^3$ pass into the pinion and by means of which the pinion may be adjusted.

$A^{10}$ is a lower bracket in the lower part of the dial casing, to one side of its center, and provided with bearings at $a^{10}$.

K is the pendulum shaft having knife-edge bearings mounted in the bearings $a^{10}$ and K' is a three-armed lever carrying the pendulum shaft at the juncture of its three arms.

The pendulum or weight $K^2$ is secured to the lower end of the depending arm $k^2$, and the upper end of the upper arm $k^3$, is bent into U-shape and has pivoted therein the outer end of a rack-bar L, by means of the pointed pivot screws $l, l$, entering apertures in a yoke-like bracket $l'$ on the end of the rack. The rack-bar L is inclined on its upper edge from its free end toward its pivoted end, and its lower toothed edge engages the upper side of the pinion $h$, of the dial shaft.

M indicates a cam-shaped actuating arm loosely mounted at its inner end on the pendulum shaft K and provided with a curved slot $m$, through which a screw $m'$, passes into the middle arm $k^4$, of the lever K'. To the upper rear end of the cam M, is secured the upper end of a flexible band or ribbon N, which passes around the cam surface to a point therebelow where it is provided with an apertured clip $n$ to which is connected, by a pin $n'$, the slotted, apertured upper end of the connecting rod O, the lower end of said rod being provided with a box loop $o$ having a pointed screw $o'$ extending up through its lower member and entering the bearing $b^3$ in the lower end of the screw $b^2$ at the end of the scale beam B. The flexible band or ribbon N is clamped to the cam M, by a plate $m^2$, and screw $m^8$, and the plate $m^2$ and ribbon N, are held from turning on the screw by means of a pin $n^3$ fixed to the cam and extending through apertures in the ribbon and plate $m^2$.

The rack bar L is held down to the pinion $h$, of the dial shaft by means of a sliding rod P, mounted in the bracket $A^{10}$, near the free end of the rack-bar, and under which the rack-bar slides and turns about the pinion. The distance from the dial shaft to the end of its arm $k^3$, being greater than the distance from the shaft to the widest part of the cam M, the arc usually necessary for the knife-edge bearings of the dial shaft is considerably reduced and the danger of inaccuracy in automatic computing scales, due to the slipping of the knife-edges when bearing is greatly out of the vertical, is obviated.

The sudden downward movement of the scale beam B, is further checked by a buffer R, having a supporting screw $r$, mounted in a cross piece $r'$ and having a set nut $r^2$; the buffer R being directly below the screw $o'$.

The dial casing at its front side is closed by a glass pane $A^{12}$ to protect the pendulum mechanism from dust, handling, etc.

S, designates a spirit level mounted on the upper side of the base A, to enable the scale to be set perfectly level.

Our construction renders shipment easy since the only parts that have to be removed are the pendulum and its connected parts including the connecting rod which are removed as a whole, and the purchaser may readily replace them by seating the knife-edge shaft in its bearings, connecting the connecting rod to the scale beam, moving out the rod P, till the rack has been properly adjusted and then moving the pin inwardly over the upper inclined edge of the rack. The cam and the pinion on the dial shaft being also adjustable a very fine and accurate adjustment of the dial actuating mechanism may be had. It will be noticed that as the rack is moved across the dial pinion, its inclined upper edge will engage the guide pin and the rack will gradually move around the pinion.

We do not restrict ourselves in the use of this dial or indicator actuating mechanism to the particular form of scale shown.

What we claim is—

1. In a weighing scale, the indicator actuating mechanism comprising an indicator shaft having a pinion, a pendulum shaft to one side of and below the indicator shaft, provided with a weighted depending arm, and an upward extending rigid arm, a rack pivoted at one end to the upper end of said rigid arm and extending across the upper side of the pinion, a guide beyond the pinion under which said rack extends and by which it is held in mesh with said pinion to move therearound, a cam extending inwardly from the pendulum shaft, and a flexible actuating member secured to the upper side of the cam and extending downward over its periphery.

2. In a weighing scale, the indicator actuating mechanism comprising an indicator shaft having a pinion, a pendulum shaft to one side of and below the indicator shaft, provided with a weighted depending arm, and an upward extending rigid arm, a rack pivoted at one end to the upper end of said rigid arm and extending across the upper side of the pinion, a guide beyond the pinion under which said rack extends and by which it is held in mesh with said pinion to move therearound, a cam adjustable on and extending inwardly from the pendulum shaft, and a flexible actuating member secured to the upper side of the cam and extending downward over its periphery.

3. In a weighing scale, the indicator actuating mechanism comprising an indicator shaft having a pinion, a pendulum shaft to one side of and below the indicator shaft, provided with a weighted depending arm, an upward extending rigid arm, and an intermediate inwardly projecting arm, a rack pivoted at one end to the upper end of said rigid arm and extending across the upper side of the pinion, a guide beyond the pinion under which said rack extends and by which it is held in mesh with said pinion to move therearound, a loosely mounted cam extending inwardly from the pendulum shaft and provided with a slot, a screw extending through said slot into said intermediate arm, and a flexible actuating member secured to the upper side of the cam and extending downward over its periphery.

4. In a weighing scale, the indicator actuating mechanism comprising an indicator shaft having a flange, a slotted pinion loose on the shaft, a screw extending through the pinion slot into said flange, a pendulum shaft having a three-armed lever having an upward extending arm and an inward extending arm, a weight on the lower end of the depending lever arm, a rack pivoted at one end to the upper end of the upward extending lever arm, a cam loose on the pendulum shaft and having a curved slot, a screw extending through the slot into the inwardly projecting arm of said lever, and a flexible actuating band secured to the cam and extending downward over its periphery.

5. In a weighing scale, the combination with the indicator shaft having a pinion, of a pivoted weight-carrying lever having an upwardly extending arm, a rack pivoted at one end to the upper end of said arm and extending across the said pinion in mesh therewith, a guide crossing the upper side of said rack, a cam connected to the weight lever between the ends thereof and having a pin on its upper side, a flexible band and clamping plate through which the pin passes, and a screw extending through said plate and band into the cam.

6. A scale comprising a frame base having a dial casing at one end, a scale beam mounted on the base with its free end entering the lower end of the dial casing, a platform mounted on the scale beam, a horizontal dial shaft mounted in the dial casing and provided with a dial and a pinion, a weight or pendulum lever having an upwardly extending arm to one side of the dial shaft, a rack bar pivoted at one end to the upper end of said arm and crossing the upper side of the pinion in mesh therewith, a guide under which the free end of the rack extends, a cam on the axis of the pendulum lever, a band or strap secured to the upper end of the cam and extending down over its periphery, and a connecting rod extending from the lower end of the band to the inner end of the scale beam.

7. A weighing and computing scale comprising a casing, a shaft therein having a pinion, a dial on the shaft having a computing scale on its rear side a second dial having a weight scale on its front side, openings through which said scales or charts may be read, a vertically disposed price per pound index or chart at the front opening, a vertically disposed indicating wire adjacent thereto, a pointer at the rear sight opening, a pendulum or weight lever having an upwardly extending arm, a rack pivoted at one end to the upper end of said arm and crossing the dial pinion, a guide rod under which the rack slides and turns, and a cam on the axis of the pendulum lever provided with a flexible band extending down along its periphery.

In testimony whereof we affix our signatures in presence of two witnesses.

LEE R. MEYER.
ROBERT J. YOUNG.

Witnesses:
J. A. KLUNK,
IVAN L. MEYER.